(12) United States Patent
Shyamsundar et al.

(10) Patent No.: US 8,880,527 B2
(45) Date of Patent: Nov. 4, 2014

(54) METHOD AND APPARATUS FOR GENERATING A MEDIA COMPILATION BASED ON CRITERIA BASED SAMPLING

(71) Applicant: Nokia Corporation, Espoo (FI)

(72) Inventors: Mate Sujeet Shyamsundar, Tampere (FI); Curcio Igor Danilo Diego, Tampere (FI); Vinod Kumar Malamal Vadakital, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/665,457

(22) Filed: Oct. 31, 2012

(65) Prior Publication Data
US 2014/0122485 A1  May 1, 2014

(51) Int. Cl.
*G06F 17/30* (2006.01)

(52) U.S. Cl.
CPC ....... *G06F 17/30286* (2013.01); *Y10S 707/913* (2013.01); *Y10S 707/968* (2013.01)
USPC ........... 707/737; 707/752; 707/753; 707/913; 707/968; 725/32; 382/100

(58) Field of Classification Search
CPC .......... G06F 17/30017; G06F 17/3002; G06F 17/30244; G06F 17/30781; G06F 17/30286
USPC .......... 707/737, 752, 753, 913, 968; 741/752; 725/32; 382/100
See application file for complete search history.

(56) References Cited

U.S. PATENT DOCUMENTS

| | | | |
|---|---|---|---|
| 6,118,616 A * | 9/2000 | Jeong | 360/78.07 |
| 6,836,791 B1 * | 12/2004 | Levi et al. | 709/217 |
| 7,962,933 B2 * | 6/2011 | Huang et al. | 725/32 |
| 7,983,441 B2 * | 7/2011 | Vestergaard et al. | 382/100 |
| 8,185,794 B2 * | 5/2012 | Lohmar et al. | 714/752 |
| 8,300,885 B2 * | 10/2012 | Vestergaard et al. | 382/100 |
| 2007/0244929 A1 * | 10/2007 | Huang et al. | 707/104.1 |
| 2008/0040215 A1 * | 2/2008 | Huang et al. | 705/14 |
| 2008/0098022 A1 * | 4/2008 | Vestergaard et al. | 707/101 |
| 2009/0304226 A1 * | 12/2009 | Tewfik et al. | 382/100 |
| 2011/0258705 A1 * | 10/2011 | Vestergaard et al. | 726/26 |
| 2013/0096705 A1 * | 4/2013 | Vestergaard et al. | 700/94 |

* cited by examiner

*Primary Examiner* — Frantz Coby
(74) *Attorney, Agent, or Firm* — Ditthavong & Steiner, P.C.

(57) ABSTRACT

An approach is provided for initiating generation of a media compilation based on one or more sampling criteria. A sampling platform determines at least one subset of one or more media items captured of at least one event. The sampling platform also partitions the at least one subset of the one or more media items into one or more bins and generates at least one compilation of the at least one subset of the one or more items based, at least in part, on whether the one or more media items in the one or more bins at least substantially meet one or more sampling criteria.

20 Claims, 13 Drawing Sheets

100

120

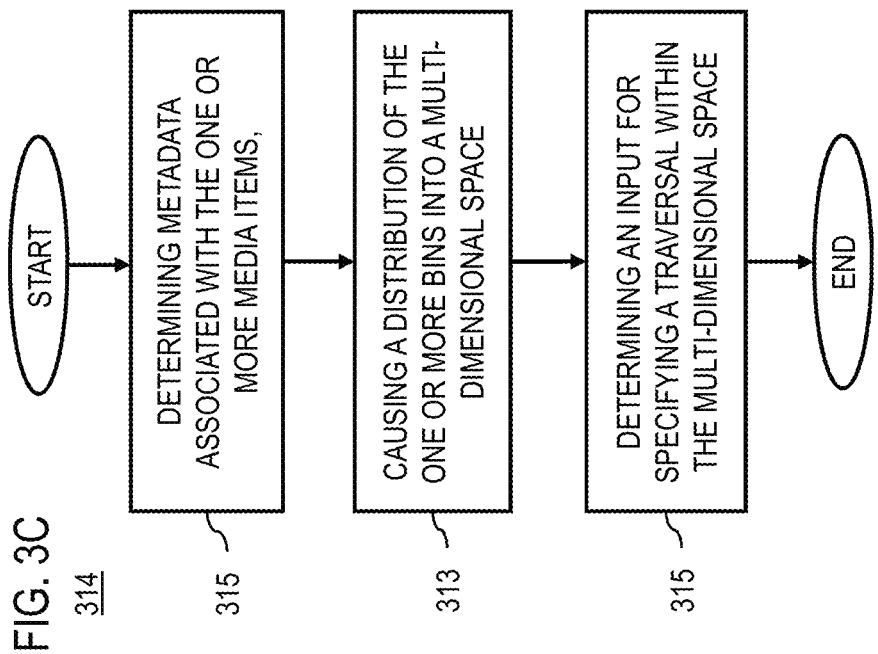

400

400

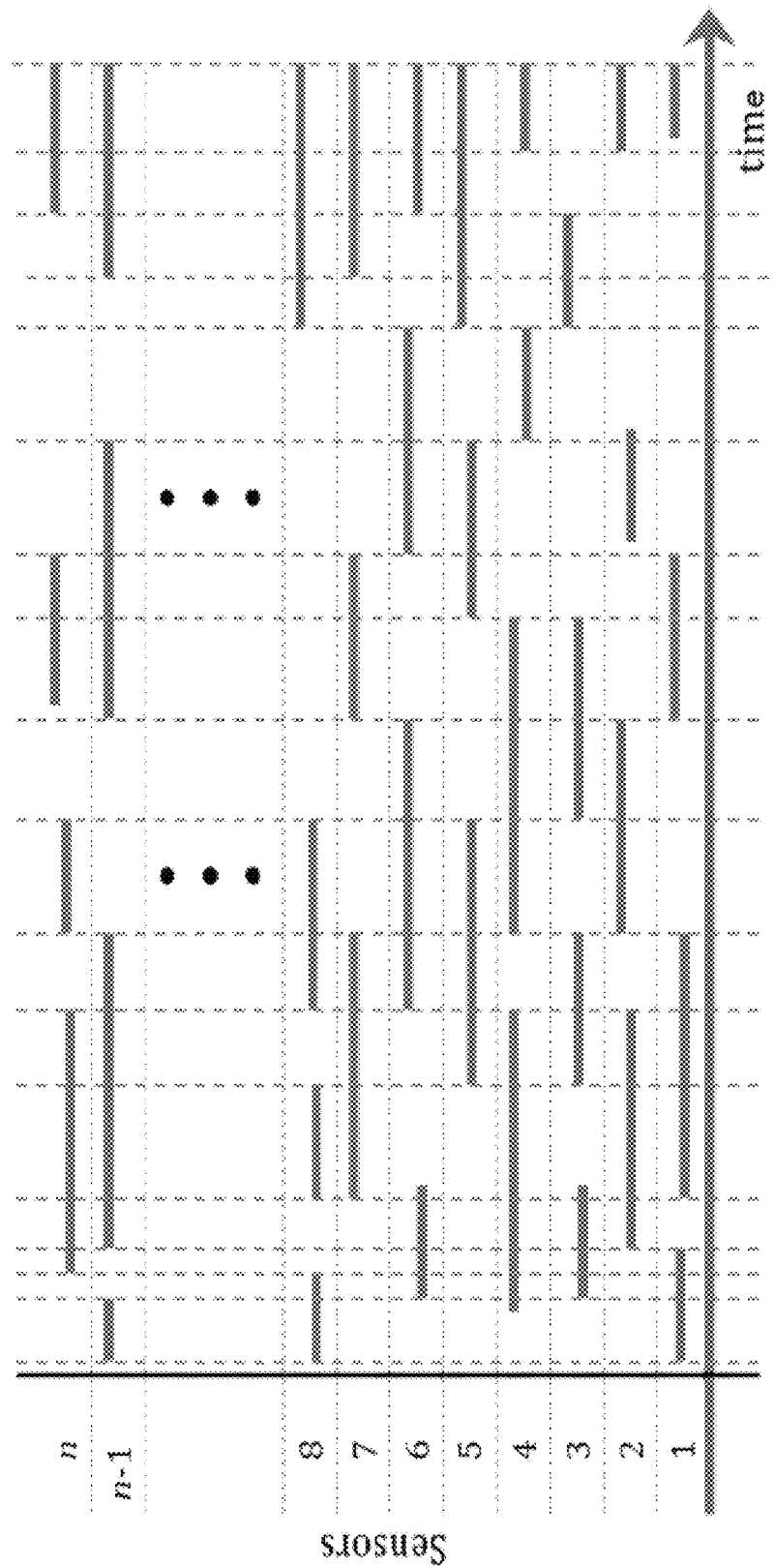

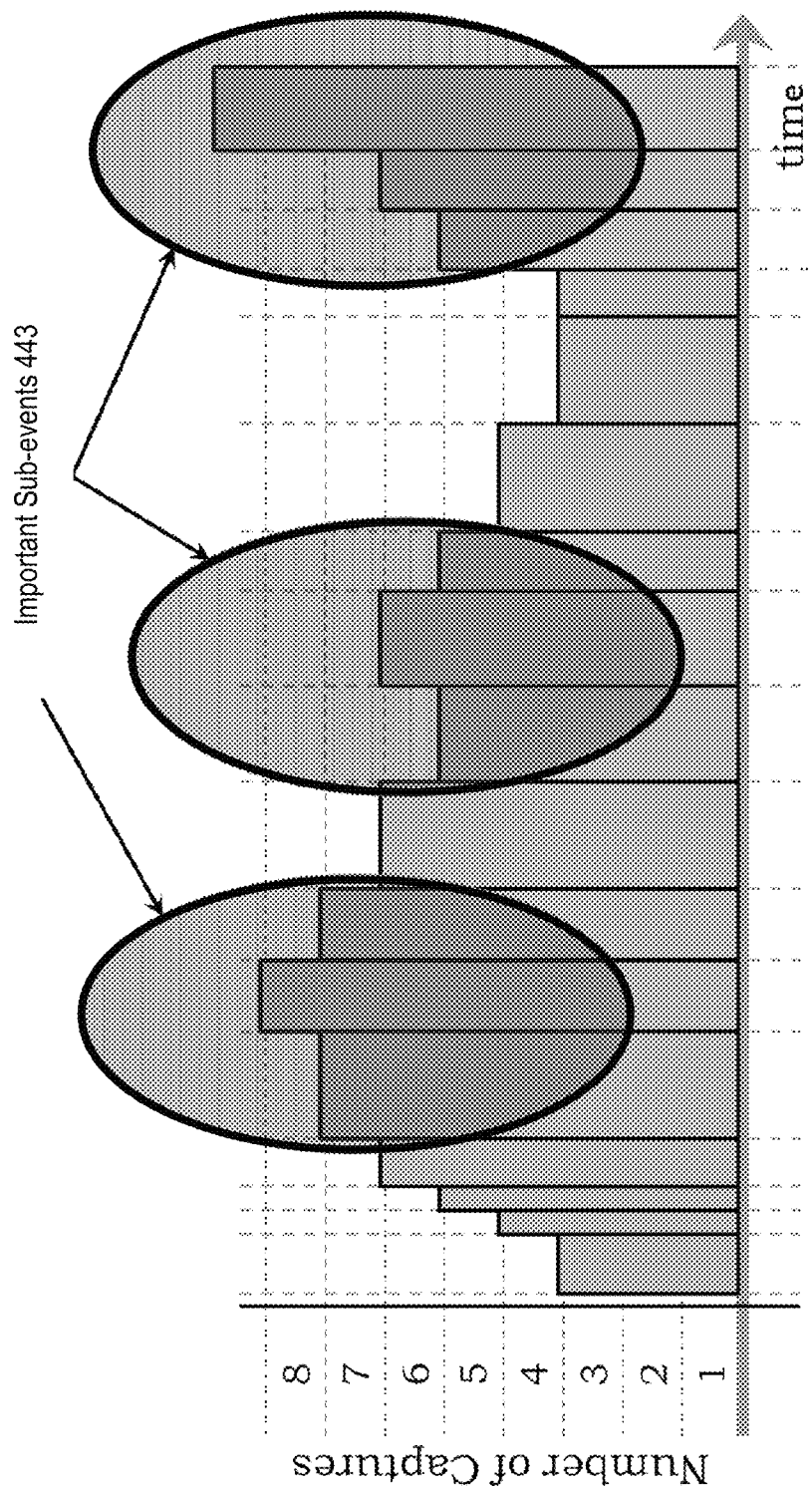

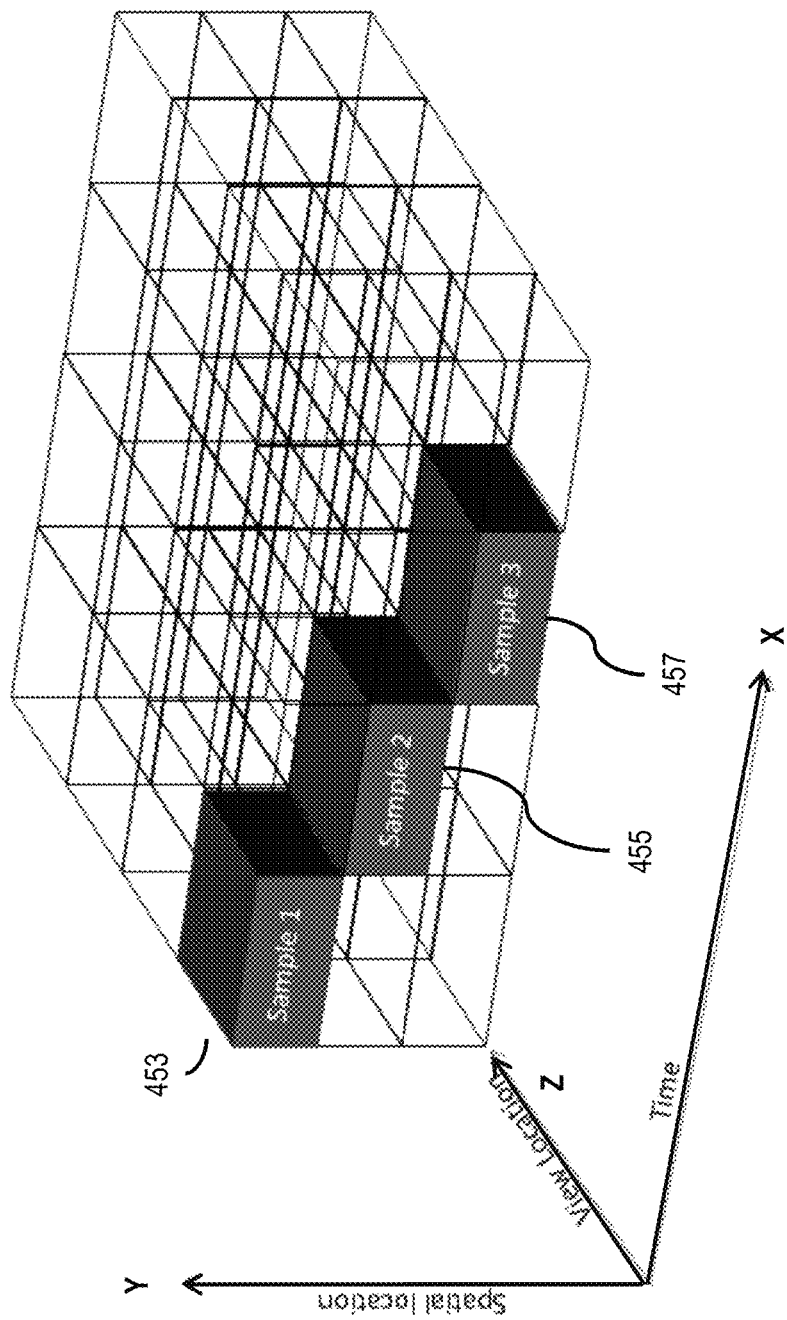

METHOD AND APPARATUS FOR GENERATING A MEDIA COMPILATION BASED ON CRITERIA BASED SAMPLING

BACKGROUND

Service providers and device manufacturers (e.g., wireless, cellular, etc.) are continually challenged to deliver value and convenience to consumers by, for example, providing compelling network services. Important differentiators in the industry are application and network services that offer entertainment (e.g., media) and location services. In particular, media sharing services allow for distribution of content to other users of the media sharing service. Traditionally, the content distributed on such media sharing services is uploaded by the one or more users via their capture devices (e.g., digital camera or smartphone). Interesting transformations of the content can be utilized to improve user experience, including transforming individual media segments as gathered for a common event into a single media compilation. Unfortunately, the quality of the compilation is dependent on the type and quantity of content provided by the different users throughout the event.

SOME EXAMPLE EMBODIMENTS

Therefore, there is a need for an approach for initiating generation of a media compilation based on one or more sampling criteria.

According to one embodiment, a method comprises determining at least one subset of one or more media items captured of at least one event. The method also comprises causing, at least in part, a partitioning of the at least one subset of the one or more media items into one or more bins based, at least in part, on one or more characteristic dimensions associated with one or more devices capturing the one or more media items, the at least one event, or a combination thereof. The method further comprises causing, at least in part, a generation of at least one compilation of the at least one subset of the one or more items based, at least in part, on whether the one or more media items in the one or more bins at least substantially meet one or more sampling criteria.

According to another embodiment, an apparatus comprises at least one processor, and at least one memory including computer program code, the at least one memory and the computer program code configured to, with the at least one processor, cause, at least in part, the apparatus to determine at least one subset of one or more media items captured of at least one event. The apparatus is also causes, at least in part, a partitioning of the at least one subset of the one or more media items into one or more bins based, at least in part, on one or more characteristic dimensions associated with one or more devices capturing the one or more media items, the at least one event, or a combination thereof. The apparatus further causes, at least in part, a generation of at least one compilation of the at least one subset of the one or more items based, at least in part, on whether the one or more media items in the one or more bins at least substantially meet one or more sampling criteria.

According to another embodiment, a computer-readable storage medium carries one or more sequences of one or more instructions which, when executed by one or more processors, cause, at least in part, an apparatus to determine at least one subset of one or more media items captured of at least one event. The apparatus also causes, at least in part, a partitioning of the at least one subset of the one or more media items into one or more bins based, at least in part, on one or more characteristic dimensions associated with one or more devices capturing the one or more media items, the at least one event, or a combination thereof. The apparatus further causes, at least in part, a generation of at least one compilation of the at least one subset of the one or more items based, at least in part, on whether the one or more media items in the one or more bins at least substantially meet one or more sampling criteria.

According to another embodiment, an apparatus comprises means for determining at least one subset of one or more media items captured of at least one event. The apparatus also comprises means for causing, at least in part, a partitioning of the at least one subset of the one or more media items into one or more bins based, at least in part, on one or more characteristic dimensions associated with one or more devices capturing the one or more media items, the at least one event, or a combination thereof. The apparatus further comprises means for causing, at least in part, a generation of at least one compilation of the at least one subset of the one or more items based, at least in part, on whether the one or more media items in the one or more bins at least substantially meet one or more sampling criteria.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are flowcharts of processes for initiating generation of a media compilation based on one or more sampling criteria, according to various embodiments;

FIGS. 4C-4E are diagrams depicting various methods of sampling and classifying the media items captured by the user devices of FIGS. 4A and 4B, according to various embodiments;

DESCRIPTION OF SOME EMBODIMENTS

Examples of a method, apparatus, and computer program for initiating generation of a media compilation based on one or more sampling criteria are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
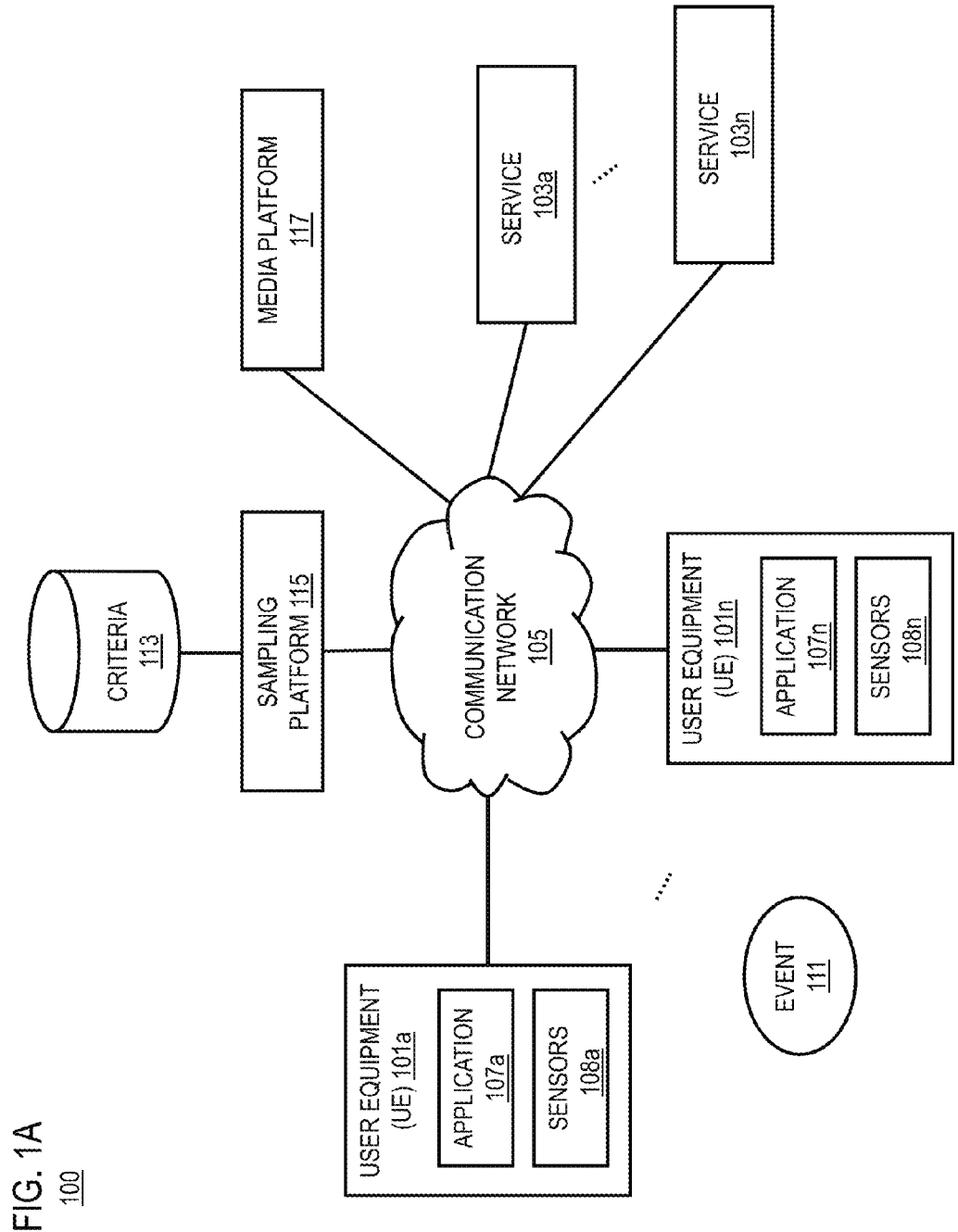
FIG. 1A is a diagram of a system capable of initiating generation of a media compilation based on one or more sampling criteria, according to one embodiment.

FIG. 1A is a diagram of a system capable of initiating generation of a media compilation based on one or more sampling criteria, according to one embodiment. The sampling criteria may include, for example, information for indicating a popularity of one or more segments of a captured event, an importance of one or more subjects in the at least one event, an importance of one or more views of the event or the like. In certain embodiments, a sampling platform 115 operates in connection with one or more media capture devices, i.e., a mobile device, internet ready camera or other user equipment (UE) 101a-101n to process such information for enabling generation of a compilation.

As noted above, an increasing number of devices, services and applications are targeted at providing social services and distributing media captured by individual users. As such, advances in mobile multimedia technology have given rise to an increase in user generated content. For example, most mobile devices on the market today feature integrated cameras and/or video recording sensors and accompanying applications for enabling on demand capture of media. Users can then readily share the content with others using one or more platforms (e.g., via the Internet) or other means.

Individual users commonly record media (e.g., video, audio, images, etc.) at events of interest. The type of events to be recorded may include, for example, concerts, festivals, sports outings, lectures, etc. As the events commence, the users employ their respective media capturing devices (e.g., a mobile phone, a camcorder, a digital camera, etc.) to record the event from different angles, perspectives or zoom factors. Consequently, objects of different types featured during the event (e.g., people, vehicles, a stage, a sports field) serve as the focal point of a given media segment at a given time of media capture. This variety of perspectives and instances of the event and/or objects thereof make for a more in-depth, albeit disconnected media viewing experience. The collection of different media segments may be made available for viewing by respective users by uploading them to a media sharing site, a social networking site or distribution via email or other communication means.

A more advantageous way to view such content would be to automatically enhance or customize media to generate a synthesized or machine-generated compilation, or transformation, of the collection of gathered media segments. Under this scenario, the captured media segments are uploaded (e.g., via a stream or file transfer) to a platform for generating the transformation. By way of example, a transformation pertains to any means of arranging, compiling and/or editing a collection of individual media segments to formulate a continuous media segment (e.g., a final video cut). The final continuous media segment is an amalgamation of the individual media segments, each of which pertain to the same event, for depicting various aspects, features and moments over a duration of time. It is noted, therefore, that the synthesized compilation (transformation) is generated automatically or otherwise without need for user intervention.

Nonetheless, many technical challenges are present in generating such a synthesized compilation. One challenge is that a large quantity of media items must be captured and uploaded to the media platform before the compilation can be generated. Resultantly, there is a large response time (latency) for enabling generation of the final output as well as a large amount of content to be processed on the backend. Another challenge occurs when there are insufficient media items featuring different views and perspectives of the event. For example, in the case of a concert, the captured media items may include similar views of the concert for the same time frames. Still further, it is difficult for the media platform to readily categorize the various media items into sub-events, i.e., individual songs of the concert, for generating compilations representing different representations of the event.

To address these issues, a system 100 of FIG. 1A introduces the capability to reduce the latency associated with the media compilation generation procedure. This includes, for example, signaling the media platform 117 to generate a compilation for a given event based on only a subset of the captured media items. As such, the subset of the media items may represent only a specific segment or portion of the event, referred to herein as a sub-event (e.g., a specific song of a concert) or further into a micro-event (e.g., a guitar riff or drum solo within the song).

Still further, the system 100 enables the media items to be sampled in various ways for determining a common set of characteristics of the respective media items. Media items of like characteristics may then be partitioned into bins, with the various media items of a bin being further processed against one or more sampling criteria. The sampling criteria may include information for conveying a subjective and/or qualitative value of the media items of a specific bin. When the sampling criteria is met to a predetermined threshold, the media platform 117 is triggered to generate a compilation based on the media items comprising the bin; thus minimizing the amount of data required to be uploaded to the media platform 117 and the amount of time required for generation of a compilation (e.g., a response time).

In certain embodiments, the system 100 includes a sampling platform 115, which operates in connection with the media platform 117 for performing sampling and evaluating the captured media items based on the sampling criteria. In addition, the sampling platform 115 interacts with UE 101a-101n to facilitate the gathering of metadata or other information on behalf of, or in conjunction with, the media platform 117. The UE 101 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101a-101n may be positioned at different locations relative to the location/occurrence of the event 111 for capturing media segments or for focusing upon one or more objects during an event 111. In certain embodiments, the UEs 101a-101n serve as media capture devices for acquiring, via sensors 108a-108n, photos, video clips, audio clips, etc. In addition, the sensors 108a-108n may capture context information related to the event or objects thereof such as speed information, temporal information, zoom information, orientation information and the like. The UEs 101a-101n may trigger execution of the sampling platform 115, such as when an application 107a-107n for capturing media items is initiated. Under this scenario, for example, the application 107a-107n may be a video recording application or media playback application for facilitating media capture, recording and playback of media items in connection with an event 111.

During media capture, information for specifying the popularity or importance of a particular event, sub-event or object thereof may be determined. In addition, the sampling platform 115 may determine an importance or popularity of a given view of the event, sub-event or subject of the event. The determination may be made by the sampling platform 115 based on the processing of context information captured by the sensors 108a-108n of the UE 101a-101n. For example, a high quantity of media items having the same temporal information may indicate the popularity of the event 111 for a specific moment in time. As another example, a high quantity of media items having the same location information and orientation information may indicate the popularity or importance of a particular event view or subject of the event versus others views or subjects corresponding to different locations and/or positions at a given time. In either case, the sampling platform 115 utilizes the popularity and importance information to determine a subset of the overall media items to be processed initially by the media platform 117 for generating a compilation. This enables the sampling platform 115 to restrict the set of all available media items to only those most relevant and/or useful for generating a compilation. As will be discussed further, the subset of media items may be further analyzed against sampling criteria 113a for determining an extent to which the subset of media items satisfies one or more conditions for generation of a compilation.

It is noted the popularity or importance information may be appended to the respective captured media items as metadata by the sampling platform 115. Under this scenario, the sampling platform 115 generates the determination results and tags the corresponding media items accordingly. Alternatively, the sampling platform 115 generates a signal to the application 107a-107n for initiating the tagging during uploading of the media items to the sampling platform 115. Under this scenario, the tagging is initiated by the sampling platform based on the analysis of prior media items received for the event; such that the tagging occurs after x amount of seconds or number of samples are captured for the same event. While this implementation corresponds to automated tagging of the media items, it is further noted that in certain instances the metadata may be specified directly by users of the UE 101a-101n. In this case, the user may select one or more action buttons, as rendered by the sampling platform 115 via the interface of the application 107a-107n, for specifying the popularity or importance of the current media item being captured.

In certain embodiments, the sampling platform 103 partitions the subset of media items into one or more bins based on sampling of the media items according to various approaches. By way of example, the sampling methods may include a temporal sampling of the media items, spatial sampling of the media items, view sampling of the media items, or a combination thereof. Under these approaches, the sampled media items are categorized into respective bins for indicating a particular category or characteristic of the media items comprising the bin. As such, binning of the subset of media items enables the plurality of media items captured for a particular event to be further organized and categorized into respective sub-events and micro-events. Of note, the bins are based on a discretization of the media items as categorized per the various sampling approaches, where the discretization corresponds to a time line representing the duration of the event relative to the earliest and latest timestamp of available media items.

By way of example, a temporal sampling of media items may include the aligning of media items from the n sensor-groups of respective UE 101a-101n into one or more non-overlapping time intervals along the time-line of the main event. The non-overlapping time intervals represent distinct segments of time (or moments) comprising the event, thus corresponding to one or more discrete bins into which media items or portions thereof may be classified. Under this scenario, the n sensor groups may include the various sensors 108a-108n of the UE 101a-101n, including camera(s), microphone(s), magnetic compass(es), accelerometer(s), global positioning sensor(s), gyroscope(s), etc., of respective UE 101a-101n that may be active during the event 111. These sensors 108a-108n may start and stop capturing media items of the event 111 at their discretion or the sensor variances/ activities may be altered at different times throughout the event. Resultantly, temporal sampling pertains to assigning of the time interval bins based on when respective media items are started and stopped.

Figure 1B:
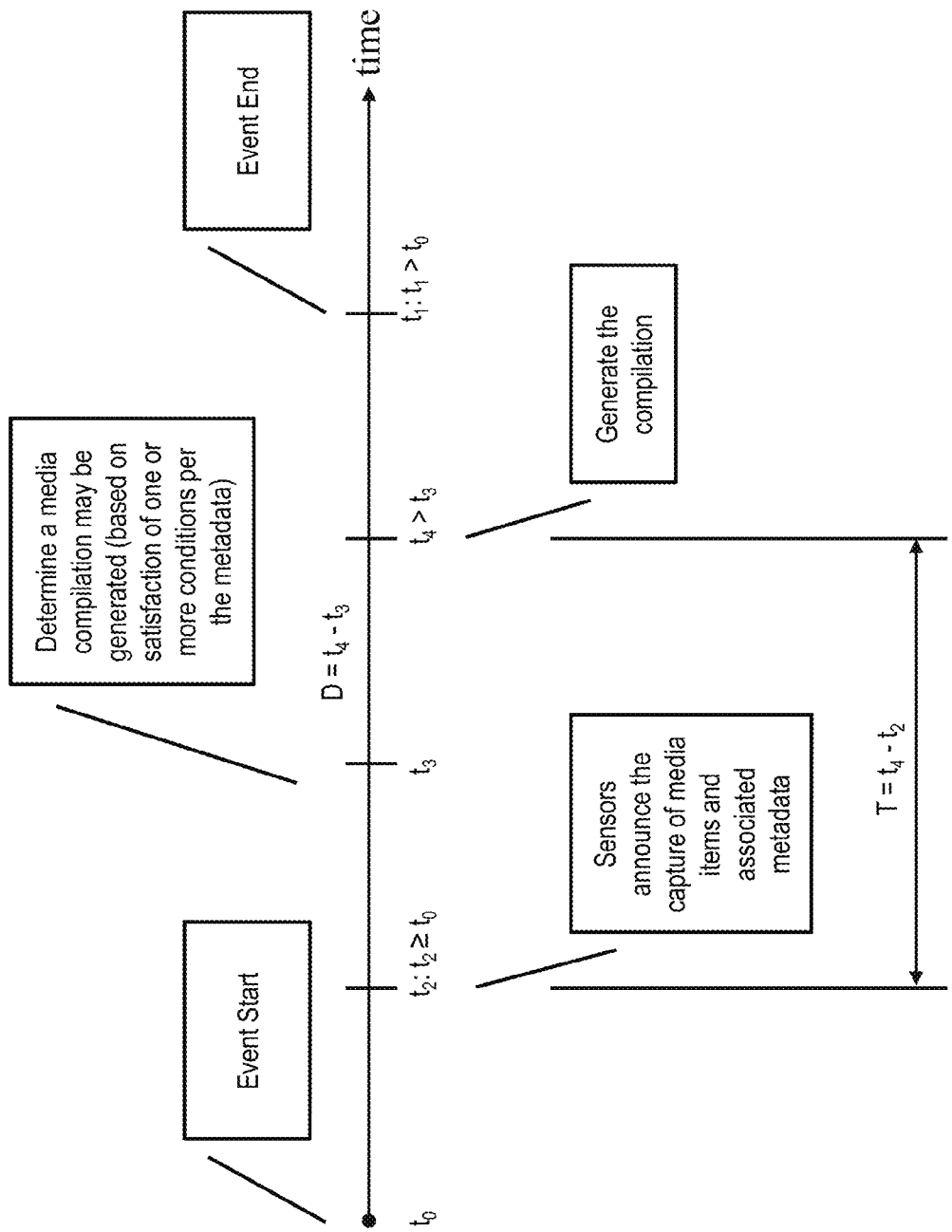
FIG. 1B is a diagram of a timeline depicting a sequence of events for generation of a media compilation by the system of FIG. 1A, according to one embodiment.

For the purpose of illustration of this sampling approach, FIG. 1B presents a timeline 120 of a scenario wherein the event 111 starts at time $t_0$ and ends at time $t_1$: $t_1 > t_0$. Under this scenario, it is assumed that the sensor-groups (e.g., sensors 108a-108n) announce the capture of media items to the sampling platform 115 at a time $t_2$: $t_2 > t_0$. The sampling platform 115 processes the media items as captured, including the associated metadata, at time $t_2$ to determine if the media items satisfy one or more conditions for enabling generation of a media compilation. By way of example, the conditions may include a count of the number of media items for respective discrete bins, a predetermined threshold of popularity of an event or segments thereof, a predetermined threshold of importance of a particular view and/or subject of the event 111, a level of affinity between various characteristic dimensions of the captured media items, or a combination thereof. It is noted, therefore, that the conditions may be associated with quantitative and/or qualitative measures (e.g., sampling criteria 113a) for specifying a level of availability and/or reliability of current media items for generation of a compilation.

Per the above mentioned processing scenario, the sampling platform 115 is able to determine at time $t_3 > t_0$ that a media compilation may be generated. Hence, the conditions for generating a subjectively satisfactory compilation per the available media items are met. Under this scenario, the sampling platform 115 triggers execution of the media platform 117, which generates the compilation at time $t_4 > t_3$ (e.g., compilation is available for user viewing). For the purpose of example, if $D = t_4 - t_3$ is the processing delay required to produce the compilation at the media platform 117, then time interval $T = t_4 - t_2$ is the response time for the first compilation. More enhanced compilations can then be generated subsequently by the media platform 117 after time $t_4$.

It is noted that the compilation is generated based on only a subset of the overall media items, thus enabling a limited/faster response time. Resultantly, the occurrence of $t_3$ is advanced in such a manner that the overall quality of the compilation does not drop more than a threshold due to the non-availability of all the potential media items for the event 111. Also, due to discretization of the time-line for the entire event 111, the sampling platform 115 may count the number of media items corresponding to each segment of the timeline (e.g., the number of media items or segments thereof corresponding to a particular temporal bin). As such, it is possible to segment events into macro and micro events (e.g., sub-events) for a discrete time by applying a probability function to the count of media items.

In certain embodiments, spatial sampling pertains to the process of time-alignment of media items from the n sensor-groups (e.g., sensors 108a-108n) from spatial locations of interest. The locations of interest may be a subset of all the spatial locations available during the time of capture of the event. By way of example, in the case of an event taking place within an arena, spatial sampling may include classification of the UE 101a-101n into respective bins based on their location relative to the event 111 in the arena. Hence, the classification is dependent on the nature of the performance arena as well as on how the various UE 101a-101n are spread about the arena. The sampling platform 115 may account for different event types and/or arena types, including a concert arena, a track and field arena, a race track arena or the like.

In one example of spatial sampling, bins may be generated based on a partitioning of the audience area of the arena into different partitions, such as (a) front-left, (b) front-middle, (c) front-right, (e) center-left, (f) center-middle, (g) center-right, (h) back-left, (i) back-middle, and (j) back-right. As another example, bins may be generated based on angular partitioning of the audience area of the arena. Under this scenario, therefore, a respective bin may be based on an angular partition starting from 0 degrees at one end of the major axis of the stage (e.g., location of the event 111), passing through the center of the performing stage (e.g., 90 degrees) and the audience area and increasing angularly to the right of the stage. In the case of an event 111 stage setting surrounded by the audience, the angular partitioning may correspond to a maximum of 359 degrees.

In certain embodiments, view sampling of the media items may include the process of classifying the views of the event 111 as captured via by the different UE 101a-101n. The views may pertain to the different perspectives, angles, focal points or vantage points of the event 111 from the perspective of a viewer of the event (e.g., per the audience) and or specific objects in focus. By way of example, in the case of a football event being recorded by different UE 101a-101n, the views captured for the game will vary significantly depending on the interests of the spectators—i.e., a focus on the cheerleaders versus a focus upon a favorite player. Hence, one or more bins may be generated by the sampling platform 115 for categorizing the different views over the duration of the event 111. It is noted that the views of a common focal point may vary based on the elevation, orientation, position, and location of the UE 101a-101n at the time of capture as well as a magnification and/or zoom level of a sensor 108a-108n.

It is noted, for the above described sampling approaches, that the bins to which media items may be classified represent one or more characteristic dimensions. The characteristic dimensions include a temporal dimension, a spatial dimension and a view dimension in this example. It is contemplated in further embodiments that other characteristic dimensions may also be enabled based on other modes and approaches of sampling. In the case of the sampling approached described herein, the three independent characteristic dimensions may be further processed by the sampling platform 115 according to a three dimensional vector space. Under this scenario, each characteristic dimension in the space denotes a specific sampling of a representative media item for the event 111.

In certain embodiments, the sampling platform 115 enables the sampled media items classified to respective bins to be further classified into a multi-dimensional space. By way of example, in the case of the three types of sampling, this corresponds to a three-dimensional space wherein the media items are represented as three dimensional polygons (e.g., vectors). Each axis of the three-dimensional space therefore corresponds to a characteristic dimension of a bin of media items, namely time, spatial location and view. As the number of media items related to the event 111 increase, the polygons can overlap or consume polygons of other captures to form larger polygons. Under this approach, a media compilation can be generated as a walk within a polygon or a traversal within the multi-dimensional space from one polygon to another polygon.

The traversal may represent a time sequenced organization of the polygons corresponding to an unfolding of the event 111, with each block representing a space-time-view sample of a media item. As such, a compilation may be generated by the media platform 117 by traversing the blocks based on the criteria chosen. A byproduct of space, time and view sampling allows generation of different compilations by following different routes in the multi-dimensional space. Also, the sub-set of polygons corresponds to a sub-set of captured media item used to generate the compilation with minimal loss of subjective quality of the compilation. As noted, the minimal loss of quality is achieved by analyzing the polygon (multi-dimensional vectors) against a predefined threshold of quantitative and/or qualitative measures corresponding to the sampling criteria 113*a*.

It is noted that the above described sampling methods may be applied to the media items by the sampling platform 115 to organize and schedule the items for upload to the media platform 117. The organizing and scheduling of the upload ensures creation of a compilation from a subset of the available media items, resulting in minimal reduction in subjective quality of the compilation. Still further, by sampling of the media items based on time, space or views, the overall quantity of media items and thus the amount of time required for generation of the compilation by the media platform 117 is required. In the case where only one sampling method is used, the reduction is smaller compared to use of multiple sampling methods simultaneously. It is noted, for example, that for a given temporal interval, the resulting bin for that interval includes all of the captured media items regardless of the views and spatial representations of the event.

It is noted that the output generated by the sampling platform 115 is conveyed to the media platform 117 for supporting generation of a final media compilation. This may include, for example, conveyance of the output to the media applications 107*a*-107*n* of respective UE 101*a*-101*n* for use in capturing one or more media segments. By way of example, per the above described operations, the output rendered by the sampling platform 115 may include: (1) a categorized subset of the media items into one or more bins; (2) metadata associated with the various subsets of media items for conveying sampling criteria; and (3) a distribution of the one or more bins into multi-dimension segments (e.g., polygons) for generation of one or more media compilations.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101*a*-101*n*, sampling platform 115 and media platform(s) 117, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the UE 101 and sampling platform 115 interact according to a client-server model. Per this model, a client process sends a message including a request to a server process and the server process responds by providing a service. The server process may also return a message with a response to the client process. Often the client process and server process execute on different computer devices, called hosts, and communicate via a network using one or more protocols for network communications. The term "server" (e.g., the platform 115) is conventionally used to refer to the process that provides the service, or the host computer on which the process operates.

Similarly, the term "client" (e.g., the UE 101) is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

It is noted that while shown as separate entities, the sampling platform 115 may be integrated within the media platform 117 accordingly. Also, the sampling platform 115 may be implemented for direct execution by a client device. Under this scenario, the client device operates as the server process per the client-server model. Still further, the sampling platform 115 may be implemented according to a peer-to-peer network topology.

Figure 2:
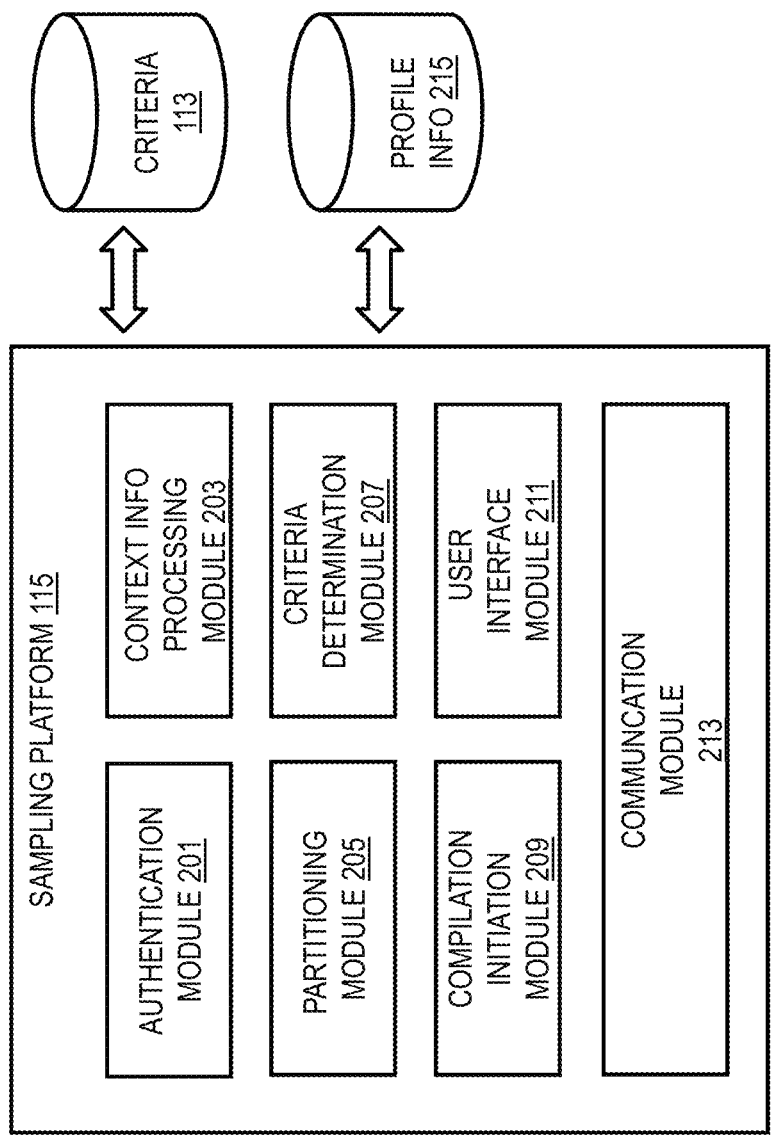
FIG. 2 is a diagram of the components of a sampling platform, according to one embodiment.

FIG. 2 is a diagram of the components of the sampling platform according to one embodiment. By way of example, the sampling platform 115 includes one or more components for initiating generation of a media compilation based on one or more sampling criteria. It is contemplated that the functions of these components may be combined in one or more components or performed by other components of equivalent functionality. In this embodiment, the sampling platform 115 includes an authentication module 201, a context information processing module 203, a partitioning module 205, a criteria determination module 207, a compilation initiation module 209, a user interface module 211 and a communication module 213.

In one embodiment, an authentication module 201 authenticates users and user devices 101a-101n for interaction with the sampling platform 115. By way of example, the authentication module 201 receives a request from a UE 101 to process context information associated with the UE 101 during or in preparation for capture of an event 111. This request may be signaled by activation of an application 107a-107n, such as a media capture application, at the UE 101. The request may include, for example, passage of information for identifying the user of the UE 101 or device information pertaining to the UE 101. Under this approach, the authentication module 201 may receive an IP address, a carrier detection signal of a user device, mobile directory number (MDN), subscriber identity module (SIM) (e.g., of a SIM card), radio frequency identifier (RFID) tag or other identifier for recognizing the requesting user and/or UE 101. It is noted that user and/or device data may be cross-referenced against profile data 215 maintained by the sampling platform 115 for enabling validation of a given UE 101 for interaction with the sampling platform 115.

In one embodiment, the context information processing module 203 processes context information gathered by the sensors 108a-108n of respective UE 101a-101n. The processing includes analyzing context information to determine the relative location, time, position, etc., of UE 101 for capturing media related to an event. By way of example, the context information processing module 203 can determine a location of a UE 101 based on a triangulation system such as a GPS, assisted GPS (A-GPS) A-GPS, Cell of Origin, wireless local area network triangulation, or other location extrapolation technologies. In addition, standard GPS and A-GPS systems can use satellites to pinpoint the location (e.g., longitude, latitude, and altitude) of the UE 101. A Cell of Origin system can also be used to determine the cellular tower that a cellular UE 101 is synchronized with. This information provides a coarse location of the UE 101 because the cellular tower can have a unique cellular identifier (cell-ID) that can be geographically mapped.

In addition, the context information processing module 203 can be utilized to determine a range between the UE 101 and an object. The range detection can further be guided to determine how far an object centered by the UE 101 is. By way of this approach, the module 203 can be used to detect that an event object is in view and whether the view includes one or more obstructions to an event 111. Still further, the module 203 can determine the direction of a UE 101, i.e., horizontal directional data as obtained from a magnetometer (sensor) or angular offset or tilt as determined by a gyroscope (sensor). Speed and/or acceleration data may also be determined along with rotational rate information of the UE 101 about a particular reference point corresponding to the UE 101 or an event.

In one embodiment, the context information processing module 203 may operate in connection with the partitioning module 205 to determine the popularity or importance of a particular event, sub-event or object thereof. In addition, an importance or popularity of a given view of the event, sub-event or subject of the event may be determined. The determination is made based on the processing of the context information, wherein the context information is used to determine a specific subset of the media items to process. By way of example, when the partitioning module 205 determines a high quantity of media items share the same temporal information, the module 205 determines that these media items pertain to a popular moment in time of the event. As another example, a high quantity of media items having the same location information and orientation information may indicate the popularity or importance of a particular event view or subject of the event versus others views or subjects corresponding to different locations and/or positions at a given time. Based on these determinations, the partitioning module 205 determines a subset of the overall media items to be processed initially by the media platform 117 for generating a compilation.

The partitioning module 205 further determines a partitioning of the one or more media items into one or more bins. The partitioning is performed based on sampling of the media items based on one or more characteristic dimensions—i.e., temporal dimension, spatial dimension or view dimension. By way of example, the partitioning module 205 performs the sampling based on a discretization of the media items as categorized per the various sampling approaches. The discretization corresponds to a time line representing the duration of the event relative to the earliest and latest timestamp of available media items. Once the samples are generated, the bins comprising the media items are distributed into multi-dimension classifications. As such, the n dimensional classifications may be provided to the multimedia platform 117 for enabling generation of a media compilation for a given moment in time. Alternatively, a sequence of multi-dimension segments representative of the event may be linked for generating a compilation of the event for a duration of time.

In one embodiment, the criteria determination module 207 operates in connection with the partitioning module 205 to determine whether the media items are sufficient to fulfill one or more conditions for enabling generation of a media compilation. By way of example, the conditions may include a count of the number of media items for respective discrete bins, a predetermined threshold of popularity of an event or segments thereof, a predetermined threshold of importance of a particular view and/or subject of the event 111, a level of affinity between various characteristic dimensions of the captured media items, or a combination thereof. It is noted, therefore, that the conditions may be associated with quantitative and/or qualitative measures (e.g., sampling criteria 113a) for specifying a level of availability and/or reliability of current media items for generation of a compilation. Once the conditions are met, the criteria determination module 207 initiates execution of the compilation initiation module 209, which signals generation of the compilation based on the organization and/or sequencing of the media items into the one or more bins.

In one embodiment the user interface module 211 enables the generation of a user interface or one or more graphical user interface elements for conveying information to a user of UE 101a-101n. By way of example, the user interface module 215 generates the interface in response to application programming interfaces (APIs) or other function calls corresponding to the media application 107, thus enabling the display of graphics primitives. This may include, for example, displaying of event type, event information and event location data in response to current capturing of an image of an event.

In one embodiment, a communication module 213 enables formation of a session over a network 105 between the sampling platform 115 and the application 107. By way of example, the communication module 213 executes various protocols and data sharing techniques for enabling collaborative execution. It is noted that the communication module 213 may also enable the transmission of any output generated by the sampling platform to the media platform 117 for use in generating a final media compilation. This includes output generated by the context information processing module 203.

The above presented modules and components of the sampling platform 115 can be implemented in hardware, firmware, software, or a combination thereof. For example, although the sampling platform 115 is depicted as a separate entity or as a platform or hosted solution in FIG. 1A, it is contemplated that it may be implemented for direct operation by respective UEs 101a-101n. As such, the sampling platform 115 may generate direct signal inputs by way of the operating system of the UE 101 for interacting with the application 107 and for capturing media per an event 111. Alternatively, some of the executions of the above described components may be performed at the UE 101a-101n while others are performed offline or remotely per a client server interaction model between the UE 101a-101n and the platform 115.

Figure 3B:
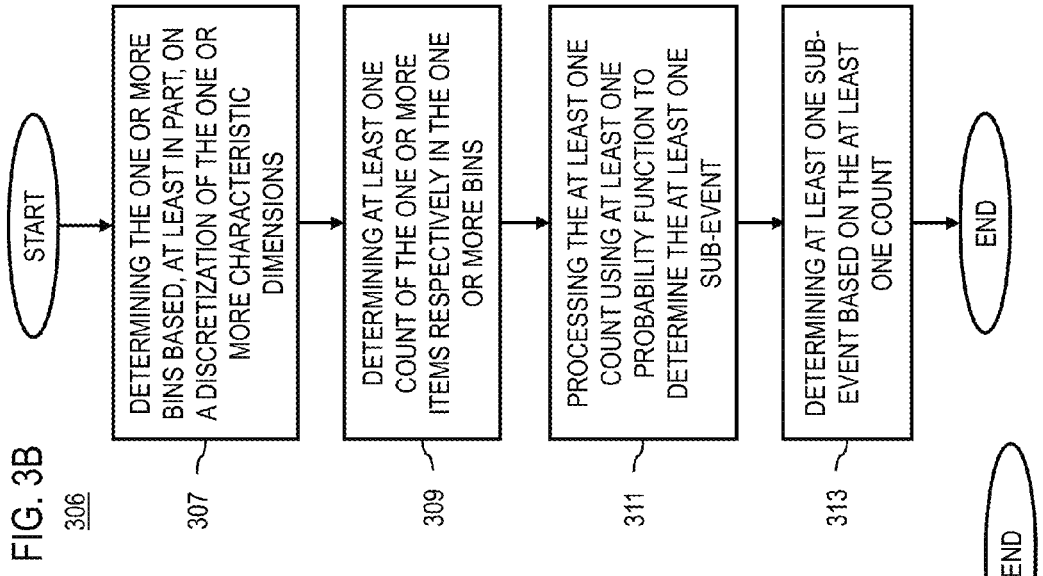
Figure 3A:
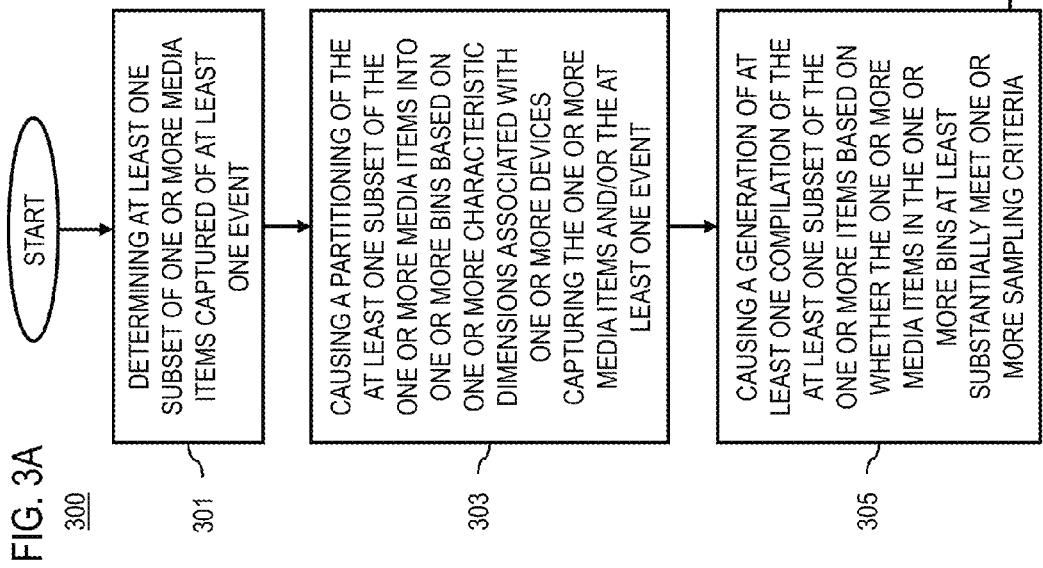
Figure 6:
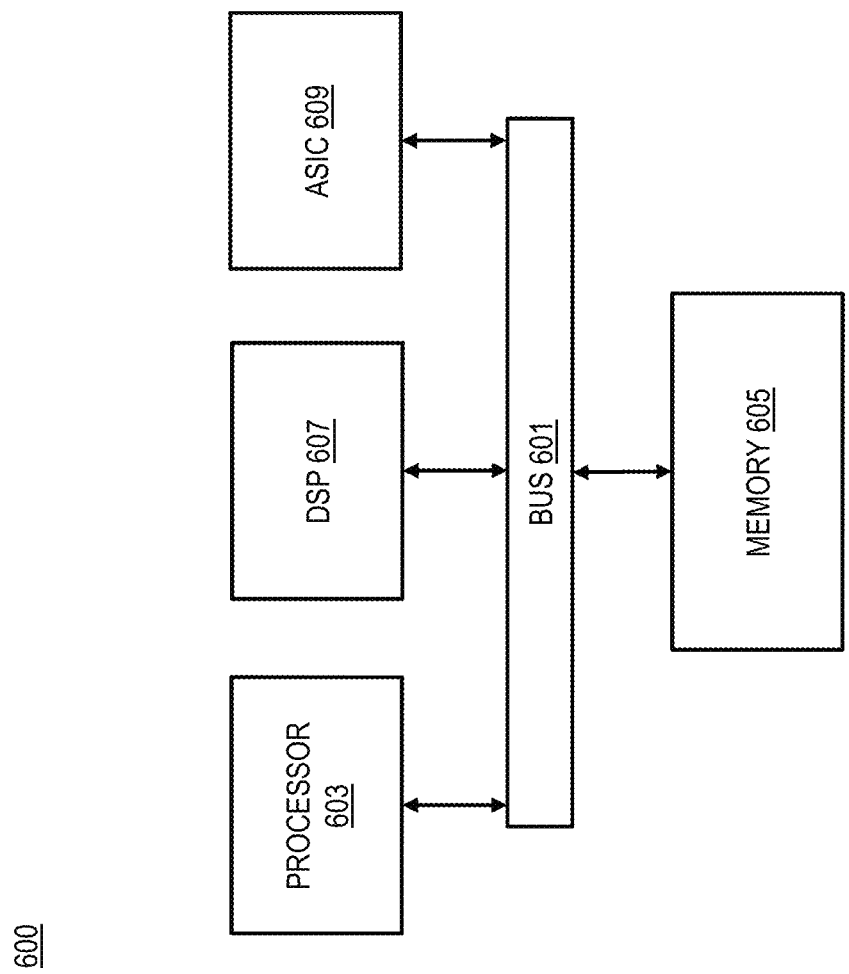
FIG. 6 is a diagram of a chip set that can be used to implement an embodiment of the invention.

FIGS. 3A-3C are flowcharts of processes for initiating generation of a media compilation based on one or more sampling criteria, according to various embodiments. In one embodiment, the sampling platform 115 performs processes 300, 306 and 314 and is implemented in, for instance, a chip set including a processor and a memory as shown in FIG. 6.

At step 301, the sampling platform 115 determines at least one subset of one or more media items captured of at least one event. In step 303, the platform 115 causes, at least in part, a partitioning of the at least one subset of the one or more media items into one or more bins based, at least in part, on one or more characteristic dimensions associated with one or more devices capturing the one or more media items, the at least one event, or a combination thereof. It is noted that the one or more characteristic dimensions include, at least in part, a temporal dimension, a spatial dimension, a view dimension, or a combination thereof. Also, it is noted that the determining of the at least one subset, the grouping of the at least one subset, the generation of the at least one compilation, or a combination thereof is performed as the at least one event is occurring, as the at least one subset is uploaded to a server, or a combination thereof In another step 305, the platform 115 causes, at least in part, a generation of at least one compilation of the at least one subset of the one or more media items based, at least in part, on whether the one or more media items in the one or more bins at least substantially meet one or more sampling criteria. By way of example, the sampling criteria may include, at least in part, a popularity of one or more segments of the at least one event, an importance of one or more subjects in the at least one event, an importance of one or more views of the event, or a combination thereof.

In step 305 of process 306 (FIG. 3B), the sampling platform 115 determines the one or more bins based, at least in part, on a discretization of the one or more characteristic dimensions. Also, in step 307, the platform determines at least one count of the one or more media items respectively in the one or more bins. By way of example, a count of the number of media items per discrete time interval bin is determined.

In another step 311, the platform 115 processes and/or facilitates a processing of the at least one count using at least one probability function to determine the at least one sub-event. As mentioned above, the sub-event may correspond to a macro or micro event, thus specifying a segment or portion of an event over its duration. Per step 313, the platform 115 determines the at least one sub-event based on the at least one count. By way of example, the generation of the at least one compilation is based, at least in part, on the at least one sub-event.

In another step 315 of process 314 (FIG. 3C), the sampling platform 115 determines metadata associated with the one or more media items. As noted previously, the partitioning of the at least one subset is based, at least in part, on the metadata. Per step 317, the platform 115 causes, at least in part, a distribution of the one or more bins into a multi-dimensional space. The multi-dimensional space corresponds to a means of combined sampling of the media items across various characteristic dimensions. As such, the one or more axes of the multi-space respectively represent the one or more characteristic dimensions.

Per step 314, the sampling platform 115 determines and input for specifying a traversal within the multi-dimensional space. The traversal corresponds to a walking along the timeline of the event from one multi-dimensional sample to the next. Under this scenario, the at least one compilation is generated based, at least in part, on the traversal.

Figure 4A:
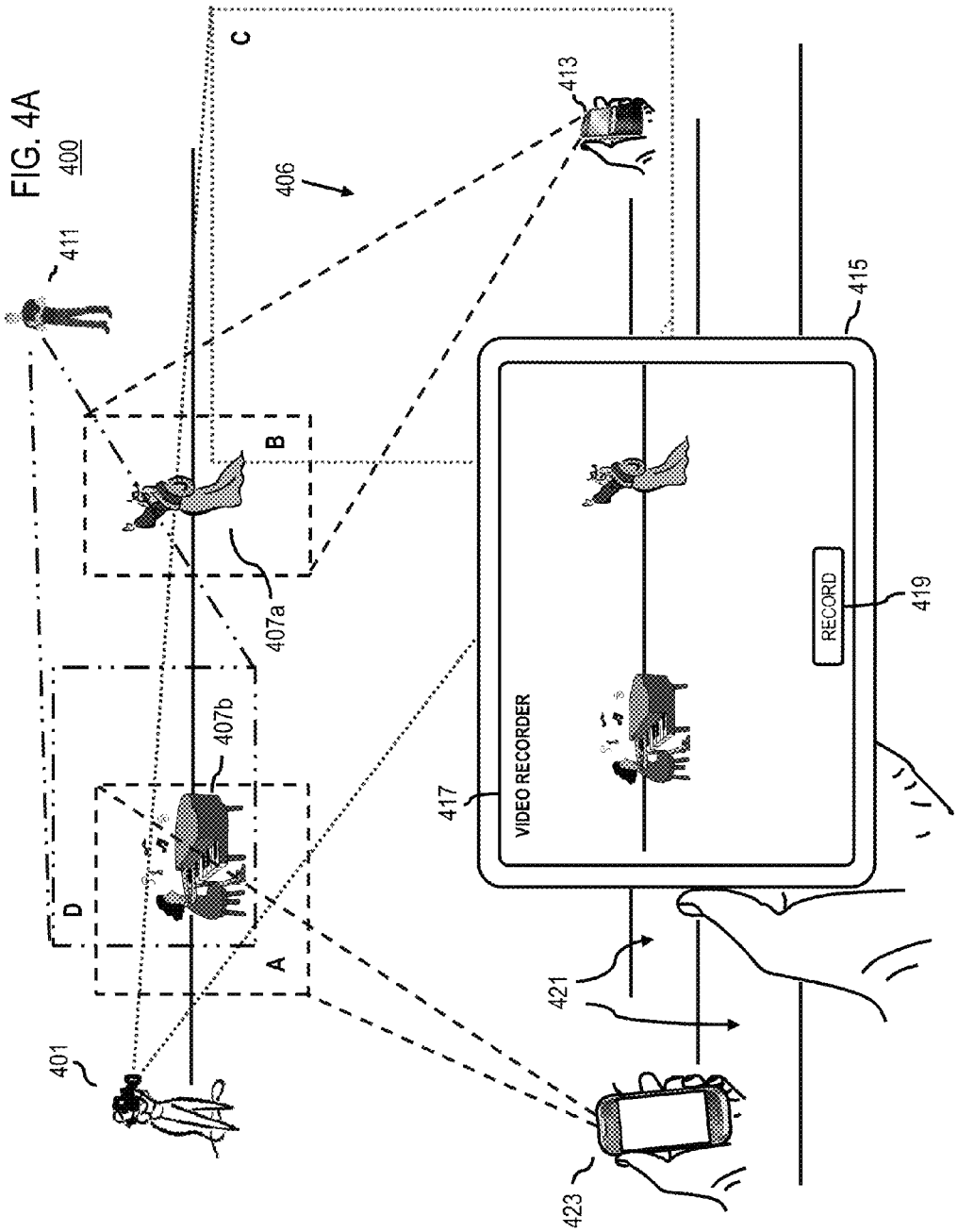
FIGS. 4A and 4B are diagrams of multiple user devices capturing media of an event from different perspectives, according to various embodiments.
Figure 4B:
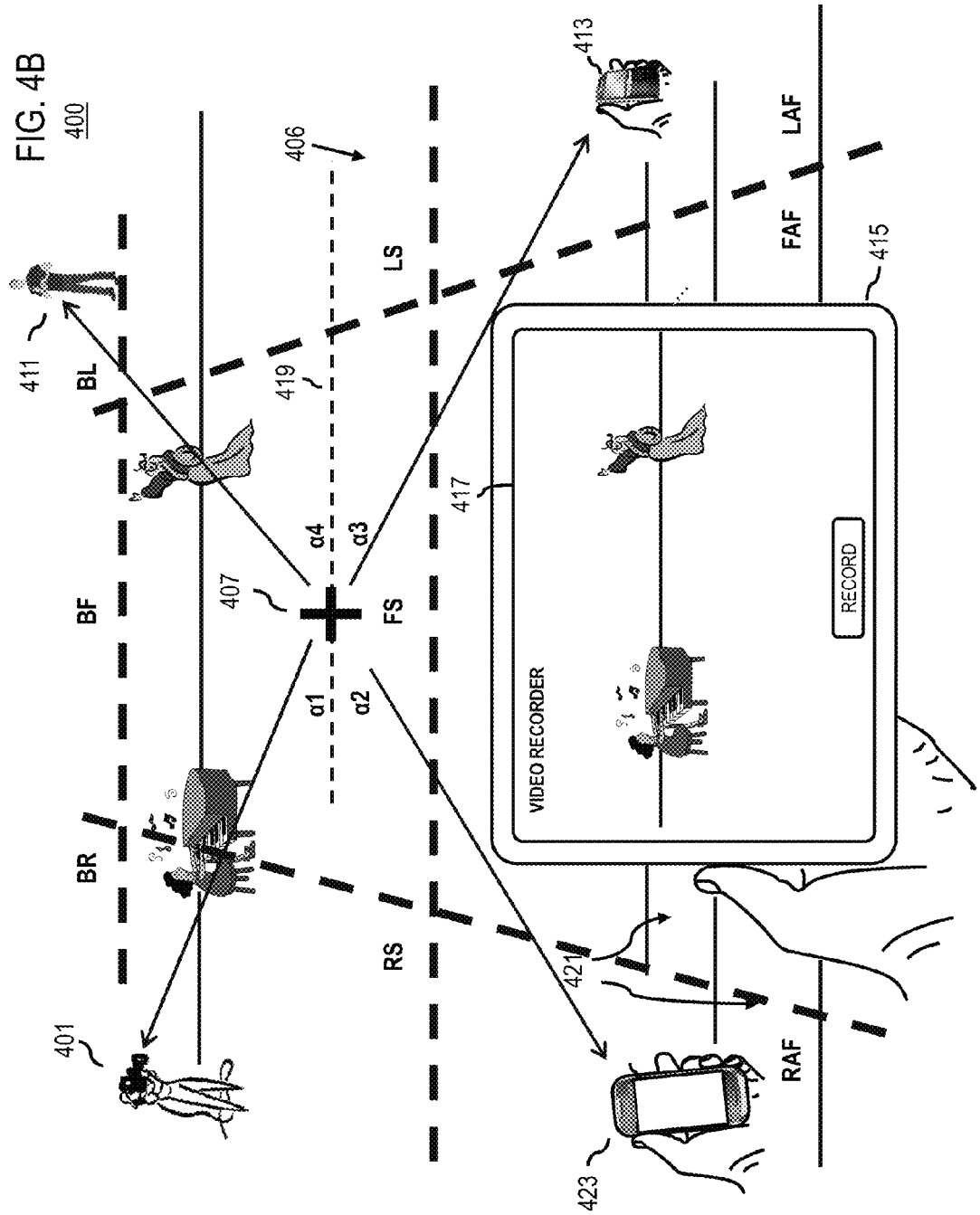

FIGS. 4A and 4B are diagrams of multiple user devices capturing media of an event from different perspectives, according to various embodiments. FIGS. 4C-4E are diagrams depicting various methods of sampling and classifying the media items captured by the user devices of FIGS. 4A and 4B, according to various embodiments. For the purpose of illustration, the diagrams are described from the perspective of a use case of one or more users attending a concert event 400 that is taking place on a stage area 406. The users capture (record) the event utilizing their respective media capture devices, which are configured to interact with the sampling platform 115. It is noted that the stage area 406 or event location may correspond to different configurations and topologies, including front-and-center staging, surround/center staging, arena or track and field staging (e.g., Formula 1 race track, sporting events), etc.

In FIG. 4A, several media capture devices 401, 413, 415 and 423 record the concert from different vantage points and perspectives, some of which intersect—i.e., capture overlapping event objects. Under this scenario, a user 411 of a user device is positioned to capture media items from behind the stage area 406 where the event is taking place. The location of the user 411 corresponds to a spatial partitioning of the arena labeled as BL (backstage left) as shown in FIG. 4B, with corresponding angular partitioning from center stage 407 of α4. As the event 400 commences, the user captures video segment D, which includes various event objects pertaining to the event. In addition, a production camera device 401 is employed by a technician of the arena, as shown in FIG. 4A, for recording and transmitting the concert as a live broadcast. Under this scenario, the location of the production camera 411 corresponds to a spatial partitioning of the arena labeled RS (right stage) per FIG. 4B. The corresponding angular partitioning from center stage 407 is represented by angle α1. In this case, the technician captures video segment C, which features various event objects including members of the audience (e.g., as seated per stadium seating 421).

In FIG. 4A, device 413 belonging to a first user seated towards the left side of the stage 406 (facing outward) near the front of the arena (e.g., per stadium seating 421) records video segment B. Video segment B features an opera singer 407 performing at a moment in time of the concert. Of note, the location of the device 413 corresponds to a spatial partitioning of the arena labeled as LAF (left audience front) in FIG.

4B with corresponding angular partitioning from center stage 407 of α3. Also shown in FIG. 4A is device 423 belonging to a second user seated towards the right side of the stage 406 near the front of the arena (e.g., per stadium seating 421). The device 423 captures video segment A, which features various event objects, including a jazz pianist 407b featured in the concert. The location of the device 423 corresponds to a spatial partitioning of the arena labeled as RAF (right audience front) in FIG. 4B, with corresponding angular partitioning from center stage 407 of α2.

Another device 415 belonging to a third user seated towards the front of the stage 406 near the middle of the arena (e.g., per stadium seating 421) also captures the event 400 via their tablet device. The location of the device 415 corresponds to a spatial partitioning of the arena labeled as FAF (front audience front) per FIG. 4B, with corresponding angular partitioning of 90 degrees relative to an axis 419 about center stage 407. Under this scenario, the 90 degree angular partitioning is due to the positioning of the device 415 for capturing video front and center.

For this scenario, each of the above devices 423, 415, 413 and 401 interact with the sampling platform 115 for enabling the uploading of their respective video segments A-D to the media platform 117. In addition, the devices transmit context information to the sampling platform 115, which is processed for determining location, temporal, angular, position and orientation information pertaining to the devices and/or the event objects captured by said devices.

Based on the uploaded media items and the context information, the sampling platform 115 is able to determine a subset of media items uploaded fulfill predefined sampling conditions. In this example, the conditions include a count of the number of video segments that meet a predetermined threshold of popularity for the event. As shown in FIG. 4A, video segments A and D both include the pianist 407b, which for that moment in time represent the most popular media items or segments thereof. As another condition, the pianist 407b is also determined to be the most important view and/or subject of the event 400. By reducing the total number of video segments A-D to a subset of video segments A and D that meet the sampling criteria requirements, the media platform 117 is able to generate a compilation more readily.

The sampling platform 115 also performs various means of sampling of the video segments A-D to determine one or more characteristic dimensions of the capture devices 401, 411, 413, 415 and 423 or the corresponding event 400. For example, the partitioning of the arena into respective sections (e.g., RAF, RS, BR) as well as corresponding angular positions relative to center stage 407 corresponds to a spatial sampling of the video segments A-D. As noted, the spatial sampling is the classification of the media items based on the relative locations of the devices 401, 411, 413, 415 and 423 within the arena. As another example, a view sampling of the video segments A-D is corresponds to the determining of common focal points (e.g., the pianist 407b) from the perspective of the device users. Hence, per this sampling approach, captures can be classified based on the subjects of interest in the main event itself based on the field of view of the users. For the purpose of illustration, it is noted therefore that respective angular values α1-α4 corresponding to axis 419 from center stage may be readily translated into a perspective angle of the user from their location point to the event object/subject of interest.

Also, a temporal sampling is performed to determine a temporal characteristic for classification of the video segments A-D or the subset A and B. FIG. 4C depicts a chart 431, which shows a discretization of the various sensor inputs as captured by the devices, 411, 413, 415 and 423 (e.g., for generating the video segments A-D) at discrete intervals of time. In this case, the sensors of corresponding user devices 411, 413, 415 and 423 are depicted along the axis labeled "Sensors" while the time is shown along the axis labeled "time." It is noted that a count of the number of sensor inputs corresponding to a given time frame may be determined for identifying which video segments A-D or portions thereof satisfy the sampling criteria/conditions accordingly—i.e., to generate a subset of media items to initially process.

In FIG. 4D, a graph 441 depicting a discrete sampling of the captures over a period of time is presented. Per graph 441, the number of media items and/or sensor inputs captured per the event are depicted along the axis labeled "Number of Captures" while the time is shown along the axis labeled "time." By analyzing discrete segments of the time-line for the entire event and counting the total number of all captures at each discrete time, the sampling platform 115 may identify sub-events 443. The sub-events may represent macro or micro level perspectives/times of the event as derived by the platform 115 through appropriate thresholding of the probability mass function of the captures. It is further noted that this discretization of the time-line for the event may also enable the sampling platform 115 to inform the media platform 117 of the most relevant/popular/sampled moments of the event for generation of a compilation.

In FIG. 4E, the sampled media items are shown as classified across a multi-dimensional matrix 451. The matrix is defined by characteristic dimensions of time, spatial location and view location, corresponding to axis X, Y and Z respectively. Per the matrix 451, the collections of media items as discretized into one or more bins are represented as three dimensional polygons 453-457. The polygons can overlap or consume polygons of other captures to form larger polygons. Under this approach, the sampling platform 115 enables the media platform 117 to initiate generation of a compilation representing a traversal from polygon 453, to 455 to 457 within the multi-dimensional space. In this case, the shaded polygons 453-457 represent those multi-dimensional samples that are chosen based on sampling criteria while the unshaded polygons represent a space-time view of the media items. The sub-set of polygons corresponds to a sub-set of captured media items used to generate the compilation with minimal loss of subjective quality of the compilation. It is noted that the polygons may be dynamically traversed and streamed to one or more users, thus enabling concurrent processing and presentment of a compilation.

Figure 5:
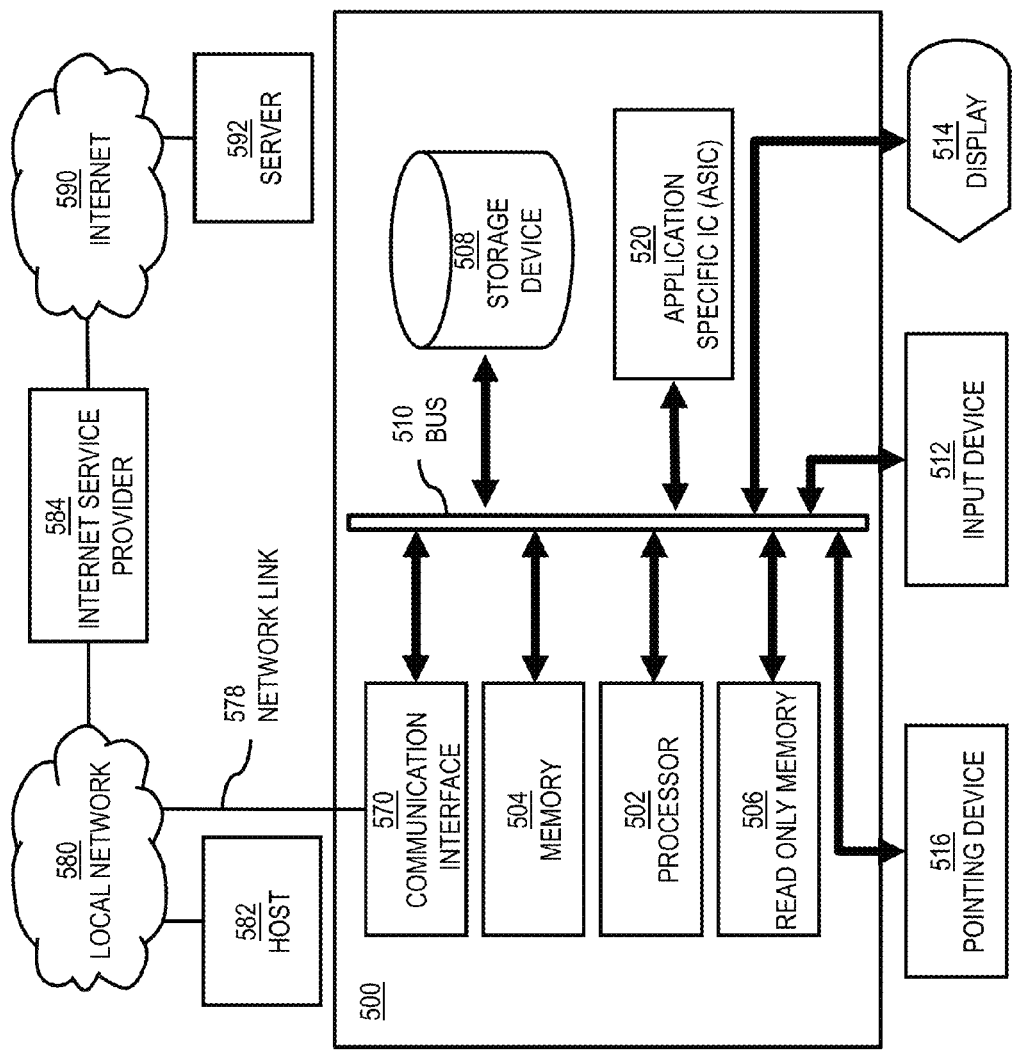
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to generate a media compilation based on one or more sampling criteria as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of generating a media compilation based on one or more sampling criteria.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to generate a media compilation based on one or more sampling criteria. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for generating a media compilation based on one or more sampling criteria. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for generating a media compilation based on one or more sampling criteria, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for generating a media compilation based on one or more sampling criteria to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to generate a media compilation based on one or more sampling criteria as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of generating a media compilation based on one or more sampling criteria.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to generate a media compilation based on one or more sampling criteria. The memory 605 also stores the data associated with or generated by the execution of the inventive steps.

Figure 7:
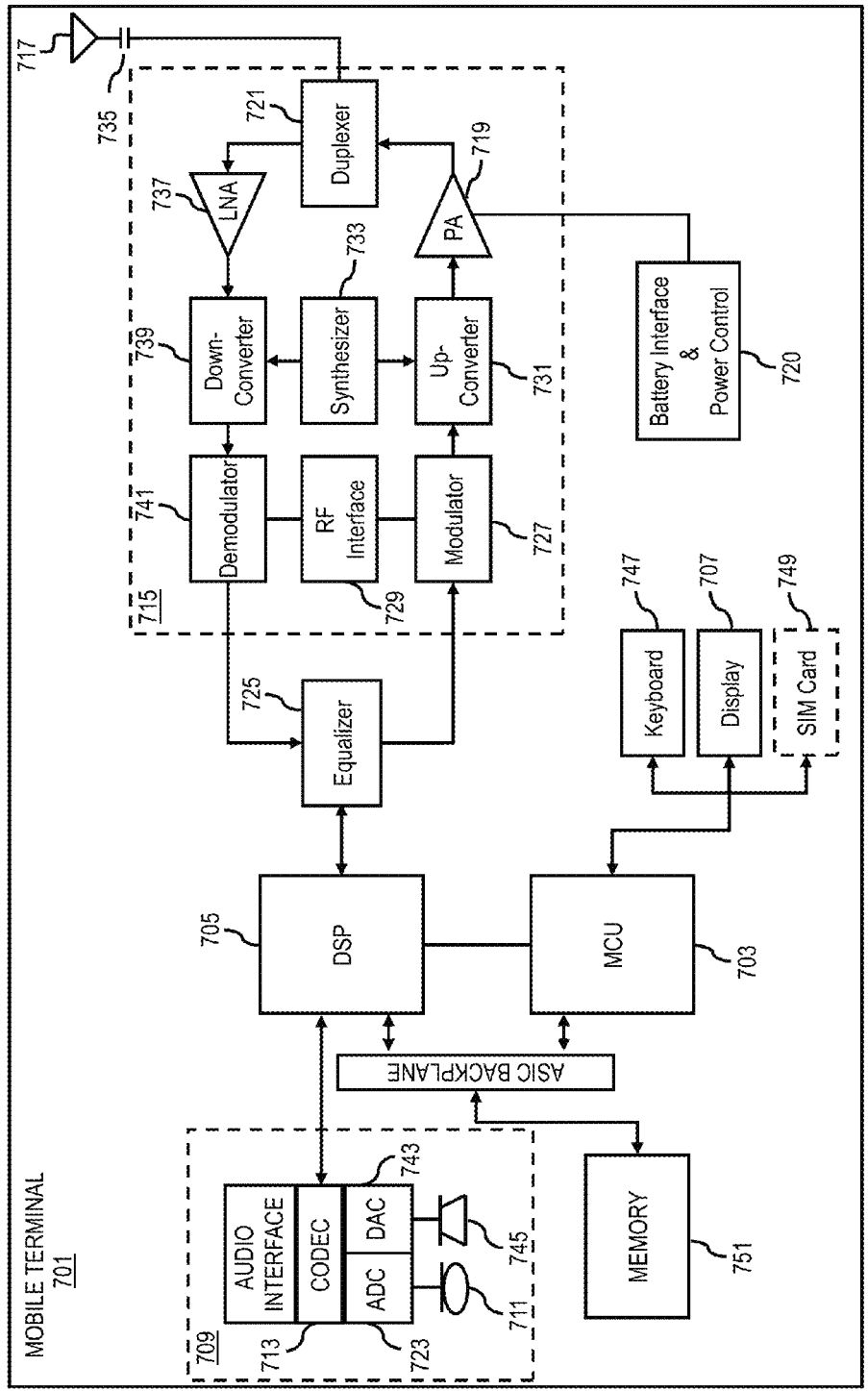
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1A, according to one embodiment. In some embodiments, mobile terminal 701, or a portion thereof, constitutes a means for performing one or more steps of generating a media compilation based on one or more sampling criteria. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of generating a media compilation based on one or more sampling criteria. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to generate a media compilation based on one or more sampling criteria. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one subset of one or more media items captured of at least one event;

a partitioning, by a processor, of the at least one subset of the one or more media items into one or more bins based, at least in part, on one or more characteristic dimensions associated with one or more devices capturing the one or more media items, the at least one event, or a combination thereof; and a generation of at least one compilation of the at least one subset of the one or more media items based, at least in part, on whether the one or more media items in the one or more bins at least meet one or more sampling criteria.

2. The method of claim 1, wherein the one or more characteristic dimensions include, at least in part, a temporal dimension, a spatial dimension, a view dimension, or a combination thereof.

3. The method of claim 1, wherein the (1) data and/or (2) information and/or (3) at least one signal are further based, at least in part, on the following:

at least one determination of the one or more bins based, at least in part, on a discretization of the one or more characteristic dimensions.

4. The method of claim 1, wherein the (1) data and/or (2) information and/or (3) at least one signal are further based, at least in part, on the following:

at least one determination of at least one count of the one or more media items respectively in the one or more bins; and at least one determination of at least one sub-event based, at least in part, on the at least one count, wherein the generation of the at least one compilation is based, at least in part, on the at least one sub-event.

5. The method of claim 4, wherein the (1) data and/or (2) information and/or (3) at least one signal are further based, at least in part, on the following:

a processing of the at least one count using at least one probability function to determine the at least one sub-event.

6. The method of claim 1, wherein the (1) data and/or (2) information and/or (3) at least one signal are further based, at least in part, on the following, and wherein the partitioning of the at least one subset is based, at least in part, on metadata associated with the one or more media items.

7. The method of claim 1, wherein the (1) data and/or (2) information and/or (3) at least one signal are further based, at least in part, on the following:

a distribution of the one or more bins into a multi-dimensional space, wherein one or more axes of the multi-dimensional space respectively represent the one or more characteristic dimensions.

8. The method of claim 7, wherein the (1) data and/or (2) information and/or (3) at least one signal are further based, at least in part, on the following:

an input for specifying a traversal within the multi-dimensional space, wherein the at least one compilation is generated based, at least in part, on the traversal.

9. The method of claim 1, wherein the sampling criteria include, at least in part, a popularity of one or more segments of the at least one event, an importance of one or more subjects in the at least one event, an importance of one or more views of the event, or a combination thereof.

10. The method of claim 1, wherein the determining of the at least one subset, the grouping of the at least one subset, the generation of the at least one compilation, or a combination thereof is performed as the at least one event is occurring, as the at least one subset is uploaded to a server, or a combination thereof.

11. An apparatus comprising:
   at least one processor; and
   at least one memory including computer program code for one or more programs,
   the at least one memory and the computer program code configured to, with the at least one processor, cause the apparatus to perform at least the following,
      determine at least one subset of one or more media items captured of at least one event;
      cause, at least in part, a partitioning of the at least one subset of the one or more media items into one or more bins based, at least in part, on one or more characteristic dimensions associated with one or more devices capturing the one or more media items, the at least one event, or a combination thereof; and
      cause, at least in part, a generation of at least one compilation of the at least one subset of the one or more media items based, at least in part, on whether the one or more media items in the one or more bins at least meet one or more sampling criteria.

12. The apparatus of claim 11, wherein the one or more characteristic dimensions include, at least in part, a temporal dimension, a spatial dimension, a view dimension, or a combination thereof.

13. The apparatus of claim 11, wherein the apparatus is further caused to:
   determine the one or more bins based, at least in part, on a discretization of the one or more characteristic dimensions.

14. The apparatus of claim 11, wherein the media items are captured live, and wherein the apparatus is further caused to:
   determine at least one count of the one or more media items respectively in the one or more bins; and
   determine at least one sub-event based, at least in part, on the at least one count,
   wherein the generation of the at least one compilation is based, at least in part, on the at least one sub-event.

15. The apparatus of claim 14, wherein the apparatus is further caused to:
   process and/or facilitate a processing of the at least one count using at least one probability function to determine the at least one sub-event.

16. The apparatus of claim 11, wherein the apparatus is further caused to:
   determine metadata associated with the one or more media items,
   wherein the partitioning of the at least one subset is based, at least in part, on the metadata.

17. The apparatus of claim 11, wherein the apparatus is further caused to:
   cause, at least in part, a distribution of the one or more bins into a multi-dimensional space, wherein one or more axes of the multi-dimensional space respectively represent the one or more characteristic dimensions.

18. The apparatus of claim 11, wherein the apparatus is further caused to:
   determine an input for specifying a traversal within the multi-dimensional space,
   wherein the at least one compilation is generated based, at least in part, on the traversal.

19. The apparatus of claim 11, wherein the sampling criteria include, at least in part, a popularity of one or more segments of the at least one event, an importance of one or more subjects in the at least one event, an importance of one or more views of the event, or a combination thereof.

20. The apparatus of claim 11, wherein the determining of the at least one subset, the grouping of the at least one subset, the generation of the at least one compilation, or a combination thereof is performed as the at least one event is occurring, as the at least one subset is uploaded to a server, or a combination thereof.

* * * * *